US012703635B2

(12) United States Patent
Rubio

(10) Patent No.: US 12,703,635 B2
(45) Date of Patent: Aug. 11, 2026

(54) EXFOLIATION OF GRAPHENE FROM BIOCHAR

(71) Applicant: Rey J Rubio, Miami, FL (US)

(72) Inventor: Rey J Rubio, Miami, FL (US)

( * ) Notice: Subject to any disclaimer, the term of this patent is extended or adjusted under 35 U.S.C. 154(b) by 274 days.

(21) Appl. No.: 18/121,974

(22) Filed: Mar. 15, 2023

(65) Prior Publication Data

US 2024/0327222 A1 Oct. 3, 2024

Related U.S. Application Data

(60) Provisional application No. 63/321,055, filed on Mar. 17, 2022.

(51) Int. Cl.
*C01B 32/19* (2017.01)

(52) U.S. Cl.
CPC .......... *C01B 32/19* (2017.08); *C01B 2204/04* (2013.01)

(58) Field of Classification Search
CPC ... C01B 32/19; C01B 2204/04; C01B 32/184; C01B 32/182; C01B 32/186; C01B 32/188; C01B 32/192; C01B 32/194; C01B 32/196; C01B 32/198; C01B 2204/00; C01B 2204/02; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23
See application file for complete search history.

(56) References Cited

PUBLICATIONS

Ciesielski, et al., Graphene via sonication assisted liquid-phase exfoliation, Chem. Soc. Rev. 2014; 43: 381-398 (Year: 2014).*

Vidal, et al., Green Solvents for the Liquid-Phase Exfoliation of Biochars, ACS Sustainable Chem. Eng. 2021; 9: 9114-9125 (Year: 2021).*

Kang, et al., Electrochemical Behavior of Graphite in Electrolyte of Sulfuric and Acetic Acid, Carbon 1997; 35(8): 1167-1173 (Year: 1997).*

* cited by examiner

*Primary Examiner* — Daniel C. McCracken

(57) ABSTRACT

A process for the efficient and cost-effective preparation of graphene from a natural source of carbon, resulting from the combination of mild, natural acids, including citric and acetic acids, with sonic frequency, as well as the use of magnets, to exfoliate graphene nanoplatelets from the natural carbon source. The natural carbon source, referred to as Biochar, can be any organic matter based and converted via pyrolytic and/or gasification means. The process includes tuning the frequency of sound energy to maximize the rate of exfoliation to a resonant frequency with the feed material itself, with a range anywhere between 1 Hz-1 THz. The use of magnets, including ferrous magnets, applies electromagnetic pressure on the as yet exfoliated Biochar fragments, which moves the fragments into the field of sound energy. The resonant exfoliation process that takes place within the bath itself, results in the hexagonal structure needed to produce graphene.

37 Claims, 2 Drawing Sheets

FLOW CHART FOR RUBICANE RESONANT FREQUENCY EXFOLIATION

FLOW CHART FOR RUBICANE RESONANT FREQUENCY EXFOLIATION
BIO-CHAR/ PYROLITIC CARBON/ CHARCOAL
EMULSION PROCESS = water/acid in container
FREQUENCY REACTOR = sonic frequency/stir/ heat
GRAPHENE SKIMMING
CARBON CONTENT WASTE
SETTLER TANK
LIQUID SETTLER
PACKING
QUALITY CONTROL
DRYER
TESTING XRD

EXFOLIATION OF GRAPHENE FROM BIOCHAR

CROSS REFERENCE TO RELATED APPLICATION

This application claims the benefit of U.S. Provisional Application No. 63/321,055 filed on Mar. 17, 2022, the disclosures of which are hereby incorporated herein by reference in their entirety.

FIELD OF THE INVENTION

The present invention relates to a method for the production of graphene by exfoliation, and the graphene obtained by such a method.

BACKGROUND

GRAPHENE OVERVIEW: Graphene is a two-dimensional form of crystalline carbon which exists as a layer of carbon atoms forming a honeycomb (hexagonal) lattice which may combine into several coupled layers of this honeycomb structure. Graphene is a parent form of all graphitic structures of carbon: graphite, which is a three-dimensional crystal consisting of relatively weakly coupled graphene layers.

In 2004 University of Manchester physicists Konstantin Novoselov and Andre Geim and colleagues isolated single-layer graphene using an extremely simple method of exfoliation from graphite. Their "scotch-tape method" used adhesive tape to remove the top layers from a sample of graphite and then apply the layers to a substrate material. When the tape was removed, some graphene remained on the substrate in single-layer form. Derivation of graphene is not a difficult task by itself; each time someone draws with a pencil on paper, the pencil trace contains a small fraction of single-layer and multilayer graphene. The achievement of the Manchester group was not only to isolate graphene flakes but also to study their physical properties. In particular, they demonstrated that electrons in graphene have very high mobility, which means that graphene could be used in electronic applications. In 2010 Geim and Novoselov were awarded the Nobel Prize for Physics for their work.

Few-layered graphene has been synthesized by numerous methods including mechanical cleavage, liquid-phase exfoliation, gas-phase synthesis, Hummers' method, unrolling of multi-walled carbon nanotubes (MWCNTs), chemical vapor deposition (CVD), epitaxial growth, an electrochemical reaction. However, these methods have some drawbacks, such as low yield ratio, high-energy consumption, the use of expensive substrates, as well as the difficulty of obtaining a high-quality product.

Graphene Production Process: The inventive graphene process consists of an aqueous liquid phase exfoliation (LPE). In general, the LPE technique is based on the exfoliation of graphite intercalated compounds in an appropriate solvent. This invention uses sonic energy to exfoliate graphene from biochar feedstocks, and has been initially reduced to practice using a bench scale ultrasonic cleaning tank which has a standard 40 KHz frequency.

The process is comprised of three subsequent steps: (1) dispersion of biochar feedstock in water (distilled water is preferrable). This aqueous dispersion may include dilute acids of mineral or organic nature to reduce the pH, (2) exfoliation by exposing the dispersion to sonic energy, and (3) collecting the exfoliated graphene from the mixture.

Feedstock used for the Process: The feedstock used to produce graphene in the instant process is biochar It may be produced in a thermal-chemical process such as a biomass gasifier or pryolyzer, such as are known in the art. The biochar types used in the demonstrating the inventive process include materials derived by pyrolyzing or gasifying a variety of biomass sources including wood pellets [3] as well as from a variety of other biochars derived from coconut shells, nut shells, and hemp biomass. Successful production of graphene has been shown to be feasible for a wide range of biochar characteristics, resulting in varying yields and rates of formation. A preferred biochar looks a lot like common charcoal and it is produced using a specific set of operating conditions to generate a high surface area (>300 m2/g) mostly carbon (>75 mass %) with little ash (<5%). For example, a typical preferred feedstock can be produced via gasification process the wood pellets are heated to approximately 1000-1200K in a downdraft gasifier where the char is exposed to very little oxygen to produce syn-gas (mostly H2 and CO), some liquid tar (Ph~3-4), wood vinegar, and the solid biochar product. The relative amounts of syngas, tar and biochar varies based on biomass type and operating conditions in the biomass gasifier. [4]

A high-speed grinder can be used to reduce the biochar particle size (~<50 micron average particle diameter) collected from the gasifer before using it in this LPE process.

Graphene production method: Introduction of the micronized char into the aqueous phase may be done manually or using a mechanical emulsifier. Other means such as combined sizing and emulsification units are feasible in many cases as well, as would be understood by one familiar with this type of liquid-solid operations.

The exfoliation step is initiated by adding the water and any pH reducing acids to the ultrasonic device. In a typical example, using hypochloric acid, the ultrasonic tank is first filled with approximately 7.5 liters of distilled water, adding approximately 2-5 milliliters of hypochloric acid to adjust the pH to approximately 3-4. Solution pH for successful exfoliation range from 2 to 7 prior to char addition. In this example, up to 500 g of biochar powder is added to the ultrasonic tank. Manual stirring was used to enhance the mixing of the carbon powder with the liquid solution in the tank. The system was then operated for 30 minutes at a temperature of between 46-48° C. for the first ten minutes, then get it decreased to 34° C. for the last twenty minutes. The solution was manually stirred every 2-3 minutes.

The graphene produced in the ultrasonic tank reactor was collected from the surface of the liquid manually using a spatula. The collected graphene slurry[1] was then heated in a convection dryer oven to remove access water and convert the graphene to a powder as the final product. Other demonstrated successful exfoliation conditions cover a range of sonic frequencies that include subsonic to mega sonic ranges, amplitudes of the input energy sources, temperatures up to 80 C, and have included the use of magnetic fields to concentrate energy onto the exfoliation sites of the char. Future work will determine the relative impact of these variables and optimal conditions.

[1] It is important to note that graphene is generally available in powder form. However, recent research suggests that handling of graphene in this state can be hazardous. In its powder form, graphene may be an irritant to the eyes, skin and respiratory tract, and inhalation of high concentrations of graphene oxide powder may cause pneumoconiosis. See Material Safety Datasheet of Graphene Oxide (GO powder, GO flakes); www.danubiananotech.com/wp-content/uploads/Datasheet-Material-Safety-GO_powder-REV_29_9_2015.pdf. last visited on Mar. 13, 2023.

Biochar and Graphene Analysis: To quantify graphene quality, several analytical methods have been developed and applied including surface area analysis (BET), Thermal Gravimetric Analysis (TGA), SEM (Scanning Electron Microscopy) and X-ray diffraction (XRD). It is hypothesized that these four analytical techniques can effectively quantify biochar quality related to graphene production as follows.

First, the TGA assesses how much inherent water, volatiles, and ash are found in the biochar which relates to how much carbon is available to produce graphene and how that carbon is bound in the char. Second, SEM provides a visual image of the char surface structure which illustrates pore structure in the biochar that also directly relates to biochar surface area and hence the biochar's ability to be broken down into graphene in the ultrasonic exfoliation tank. Third, XRD assesses the elemental content of the biochar to quantify the elemental amounts of carbon, hydrogen, oxygen, nitrogen, and sulfur are found in the biochar which is related to the char molecular structure and directly related to how the char breaks down during the exfoliation process, Fourth, the BET surface area helps to quantify the tendency of the biochar to form carbon layers (graphene) during exfoliation.

This hypothesis can be tested by analyzing several biochars from different sources which is used to produce graphene in the ultrasonic tank reactor then analyzing the graphene to measure the number of carbon layers in the graphene product.

Verifying the analysis methodology is important to quantify the degree a certain biochar can be exfoliated to produce VFL graphene (i.e., 1-3 layers).

BET SA versus Graphene Layers: Although measured BET surface area will not measure the atomic structure of graphene product, the graphene surface area is related to the quality of graphene produced. The following discussion of the BET analysis for measuring biochar surface area was done for the graphene sample produced in the instant process using a NOVA2000E Quantachrome device Measured results of the biochar surface area were between 735-744 $m^2/g$. The graphene material produced in the instant process was also quantified to confirm the number of layers present in the graphene material According to the literature, the surface area of single-layer graphene is about 2629 m2/g and 1600 m2/g for double-layer graphene. Based on this, the BET SA analyses results can be analyzed to show the correlation between BET SA and carbon layers in the graphene (see Table 1).

TABLE 1

Graphene surface area versus BET SA

| Commercial Graphene | BET Surface Area [$m^2/g$] | Number of Stacked Layers, N: Reported | Number of Stacked Layers, N: Calculated |
|---|---|---|---|
| G1 | 675 | 4 | 4 |
| G2 | 187 | 10 | 14 |
| G3 | 126 | 20 | 21 |
| G4 | 95 | N.R. | 27 |
| G5 | 26 | 25 | 100 |

An XRD test was conducted for 3-layer graphene produced in the instant process The XRD spectra of the 3-layer graphene shows well-crystallized Carbon peaks, and a broad peak related to an unidentified crystalline material.

REFERENCES www.britannica.com/science/graphene

2. Taniya Purkait, Guneet Singh, Mandeep Singh, Dinesh Kumar, & Ramendra Sundar Dey. (n.d.). Large area few-layer graphene with scalable preparation from waste biomass for high-performance supercapacitor. doi.org/10.1038/s41598-017-15463
3. Smith, J. D., Alembath, A., Al-Rubaye, H., Yu, J., Gao, X., Golpour, H. (2019) "Validation and Application of a Kinetic Model for Downdraft Biomass Gasification Simulation," Chem. Eng. Technol, 42 (12) 2505-2519. doi.org/10.1002/ceat.201900304
4. Yu, J. and Smith, J. D., (2018) "Validation and Application of a Kinetic Model for Biomass Gasification Simulation and Optimization in Updraft Gasifiers," *Chemical Engineering & Processing: Process Intensification* (DOI: doi.org/10.1016/j.cep.2018.02.003

SUMMARY

The following presents a simplified summary of the disclosure in order to provide a basic understanding of some aspects of the disclosure. This summary is not an extensive overview of the disclosure. Rather than specifically identifying key or critical elements of the disclosure or to delineate the scope of the disclosure, its purpose, inter alia, is to present some concepts of the disclosure in a simplified form as a prelude to the more detailed description that is presented later.

The invention relates to a method for the production of graphene from biochar comprising: immersing a pyrolytic carbon in an acidic liquid bath, comprising water and any acid that is citric, ascorbic, or acetic, ultrasonic or sonic frequency, and magnets; applying ultrasonic, mega-sonic, sonic and sub-sonic frequencies, magnetic flux from magnets, stirring, and heating the liquid sufficient to cause exfoliation of the pyrolytic carbon, forming a graphene layer on the top of the bath; and recovering the graphene layer in the bath by skimming the graphene platelets off of the top of the liquid and allowing the collected graphene to dry or, alternatively, to be kept in an aqueous solution in dispersion.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION AND BEST MODE OF IMPLEMENTATION

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

Figure 1:
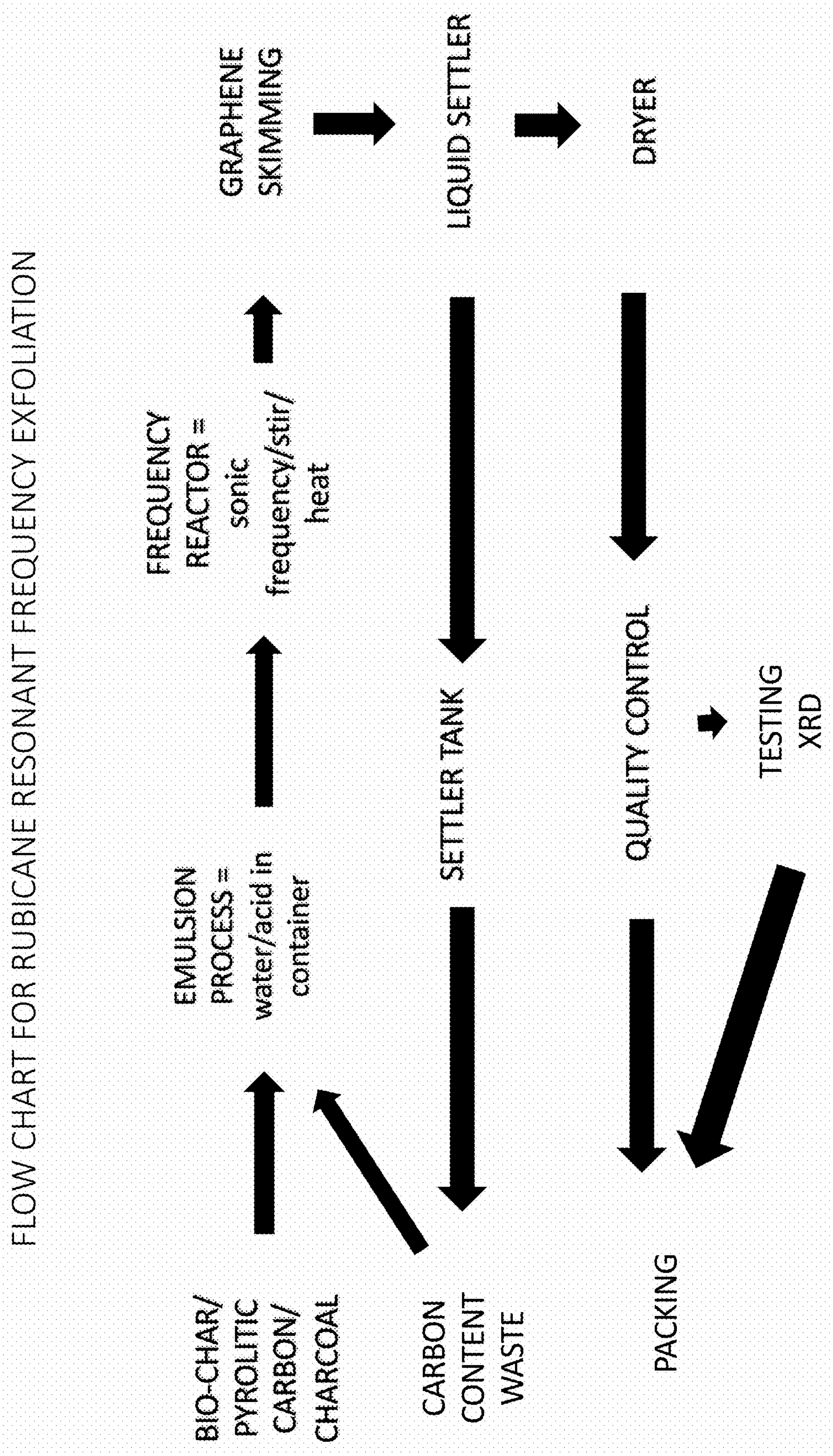
FIG. 1 illustrates the overall schematic of the process for carrying out the method and production of graphene in accordance with one implementation or embodiment.

FIG. 1 illustrates a flow chart for resonant frequency exfoliation, which begins with Biochar, a pyrolytic carbon, immersed in a water and acid mixture, the mixture being exposed to an emulsion process, applying sonic frequency to the mixture, stirring and heating the mixture in a frequency reactor, which results in a layer of graphene on the top of the liquid mixture, skimming the graphene layer, extracting it into an aqueous slurry, where the aqueous slurry can be dried thereby resulting in graphene in dry powder form, where the liquid remaining in the settler tank contains carbon content waste which is recycled to begin the process again.

Figure 2:
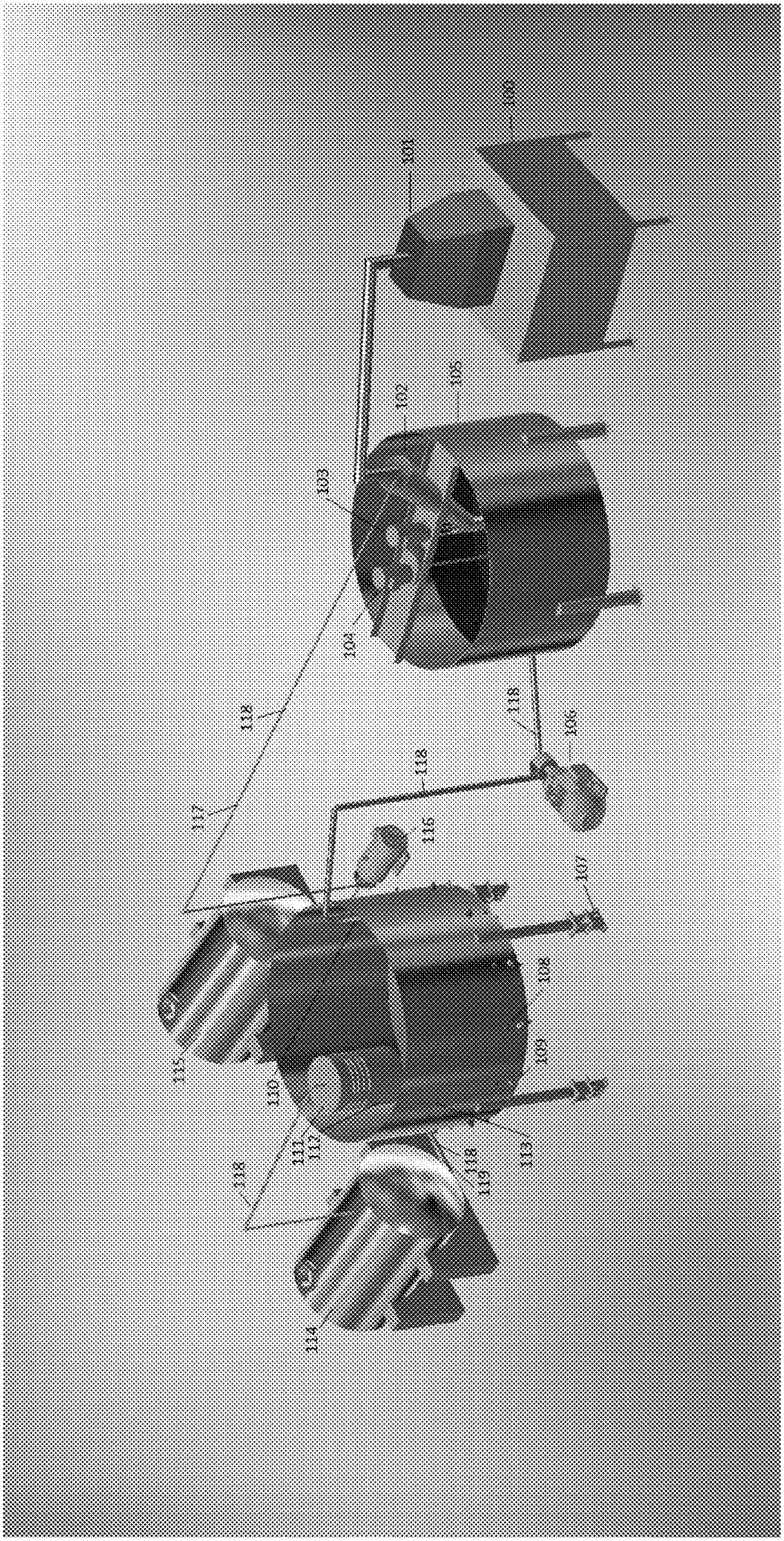
FIG. 2 illustrates the process for carrying out the method and production of graphene in accordance with one implementation or embodiment.

FIG. 2 illustrates a schematic for the industrial scale instant method of resonant frequency exfoliation. FIG. 2 illustrates a bio-char loader (100), a pneumatic lifter and hermetic sealed duct piping (101), a water and acid funnel intake unit (102) where bio-char runs through, a high speed vertical emulsifier (103), a vertical rotary mixer (104), a metal container (105), an inline emulsification pump (106), a spring attenuator (107), a 40 kilo hertz quartz transducer (108), a 28 kilo hertz quartz transducer (109), a 10 transducer parallel 1 mega hertz above frequency emitter (110), a side slit submerged skimmer (111), magnets used for skimming (112), a frequency tank (113), a liquid settler tank (114), a settler tank to process or recycle the mixture back into the system (115), an inline emulsification pump (116), a waste line for recycled liquid carbon (117) that travels through steel piping within pressure seals (118) back into the water and acid funnel intake unit (102), and a metal pipe (119) connecting the liquid settler tank (114) to the settler tank (115). This figure provides a top, side view of the frequency tank (113) and the metal container (105), before the bio-char is added to the bio-char loader (101).

Once the bio-char is added to the bio-char loader (100), it is lifted by the pneumatic lifter, through the hermetic sealed duct piping (101) and the high speed vertical emulsifier (103) into the metal container (105). The water and acid are then added to the water and acid funnel intake unit (102), to create a mixture. The mixture is stirred together in the vertical rotary mixer (104), in the metal container (105), after which the inline emulsification pump (106) propels the mixture into the frequency tank (113) through the steel piping within pressure seals (118). Once the mixture is in the frequency tank (113), the 40 kilo hertz quartz transducer (108), the 28 kilo hertz quartz transducer (109), and the 10 transducer parallel 1 mega hertz above frequency emitter (110) are applied to the frequency tank (113) to heat the mixture, at which time the spring attenuator (107) is used to tune the amplitude of the signal creating an exfoliation of the bio-char, forming a graphene layer on the surface of the mixture. Thereafter, the side slit submerged skimmer (111) and the magnets (112) are used to recover a graphene layer from the mixture by skimming graphene platelets off of the surface of the mixture. The remaining mixture is sent to the liquid settler tank (114) through the steel piping within pressure seals (118), and then the mixture is deposited in the settler tank (115) through metal pipe (119). Finally, the mixture is sent through the waste line for recycled liquid carbon (117) that through the steel piping within pressure seals (118) into the inline emulsification pump (116) which propels the mixture back into the water and acid funnel intake unit (102) to begin the process anew.

What is claimed is:

1. A liquid sonic resonant exfoliating process for producing graphene comprising:
- immersing a pyrolytic carbon in a liquid bath,
  - the liquid bath comprising mixing water and an acid in a container,
  - the acid being citric, ascorbic, or acetic,
- applying a controlled sonic frequency to the liquid bath to produce resonance with the container,
- stirring the liquid bath for a given period of time,
- heating the liquid bath to cause exfoliation of the pyrolytic carbon, forming a graphene layer on the surface of the liquid bath,
- recovering the graphene layer from the liquid bath by skimming graphene platelets off of the surface of the liquid bath via any method known in the field, resulting in graphene nanoplatelets in aqueous slurry, the aqueous slurry which can be utilized directly or dried for applications requiring the graphene platelets be in a dry powder form.

2. The process of claim 1, wherein the liquid bath is in a pH range of between 0.1 and 6.99.

3. The process of claim 1, wherein the liquid bath is 100 parts water to 1 part acid.

4. The process of claim 1, wherein the sonic frequency ranges between 1 Hz and 1 THz.

5. The process of claim 1, wherein the given period of time which the liquid bath is stirred is between 10 minutes and 90 minutes.

6. The process of claim 1, wherein the liquid bath is heated by an external heat source to a temperature between 25° C. and 80° C.

7. The process of claim 1, wherein the liquid bath reaches a temperature between 25° C. and 80° C., as a result of sonic energy absorption.

8. The process of claim 1, wherein the sonic frequency is generated using a signal generator with piezoelectric transducers to adjust amplitude and intensity of the mechanical vibrations.

9. The process of claim 1, wherein the water is deionized water.

10. The process of claim 1, wherein the ratio of the mass of pyrolytic carbon to water is 1 to 15.

11. The process of claim 1, wherein the pyrolytic carbon is comprised of biochar having at least a 70% carbon content with sp, sp2 and sp3 bonds.

12. The process of claim 1, wherein the container is made of steel.

13. The process of claim 1, wherein the container is coated with a Faraday cage.

14. The process of claim 1, wherein the resulting graphene platelets have a carbon layer count of 1 to 10.

15. The process of claim 1, wherein the skimming device includes a magnet.

16. The process of claim 1, wherein the aqueous is dried in a dehumidifier sieving rack or tumbler particulate sieved, at a temperature between 30° C. and 1000° C.

17. The process of claim 1, wherein any remaining sediment material from the bottom of the liquid bath is recycled using an emulsifier or similar device to generate additional graphene with 10 or less carbon layers.

18. The process of claim 1, wherein the liquid bath is divided into two or more compartments within the container, in which control of the sonic frequency and the stirring intensity are independent of one another.

19. A liquid sonic resonant exfoliating process for producing graphene comprising:
- immersing a pyrolytic carbon in a liquid bath,
  - the liquid bath comprising mixing water, an acid, and magnets in a container,
  - the acid being citric, ascorbic, or acetic,
- applying a controlled sonic frequency to the liquid bath to produce resonance with the container,
- applying magnetic flux having a density of at least 0.1 micro Tesla,
- stirring the liquid bath for a given period of time,
- heating the liquid bath to cause exfoliation of the pyrolytic carbon, forming a graphene layer on the surface of the liquid bath,
- recovering the graphene layer from the liquid bath by skimming graphene platelets off of the surface of the liquid bath via any method known in the field, resulting in graphene nanoplatelets in aqueous slurry, the aqueous slurry which can be utilized directly or dried for applications requiring the graphene platelets be in a dry powder form.

20. The process of claim 19, wherein the liquid bath is in a pH range of between 0.1 and 6.99.

21. The process of claim 19, wherein the liquid bath is 100 parts water to 1 part acid.

22. The process of claim 19, wherein the sonic frequency ranges between 1 Hz and 1 THz.

23. The process of claim 19, wherein the given period of time which the liquid bath is stirred is between 10 minutes and 90 minutes.

24. The process of claim 19, wherein the liquid bath is heated by an external heat source to a temperature between 25° C. and 80° C.

25. The process of claim 19, wherein the liquid bath reaches a temperature between 25° C. and 80° C., as a result of sonic energy absorption.

26. The process of claim 19, wherein the sonic frequency is generated using a signal generator with piezoelectric transducers to adjust amplitude and intensity of the mechanical vibrations.

27. The process of claim 19, wherein the water is deionized water.

28. The process of claim 19, wherein the ratio of the mass of pyrolytic carbon to water is 1 to 15.

29. The process of claim 19, wherein the pyrolytic carbon is comprised of biochar having at least a 70% carbon content with sp, sp2 and sp3 bonds.

30. The process of claim 19, wherein the container is made of steel.

31. The process of claim 19, wherein the container is coated with a Faraday cage.

32. The process of claim 19, wherein the resulting graphene platelets have a carbon layer count of 1 to 10.

33. The process of claim 19, wherein the skimming device includes additional magnets.

34. The process of claim 19, wherein the magnets are rare earth magnets having ferromagnetic or paramagnetic elements.

35. The process of claim 19, wherein the aqueous is dried in a dehumidifier sieving rack or tumbler particulate sieved, at a temperature between 30° C. and 1000° C.

36. The process of claim 19, wherein any remaining sediment material from the bottom of the liquid bath is recycled using an emulsifier or similar device to generate additional graphene with 10 or less carbon layers.

37. The process of claim 19, wherein the liquid bath is divided into two or more compartments within the container, in which control of the sonic frequency and the stirring intensity are independent of one another.

* * * * *